Nov. 2, 1937.  I. JEPSON  2,098,098
FOOD MIXER
Filed Sept. 14, 1936
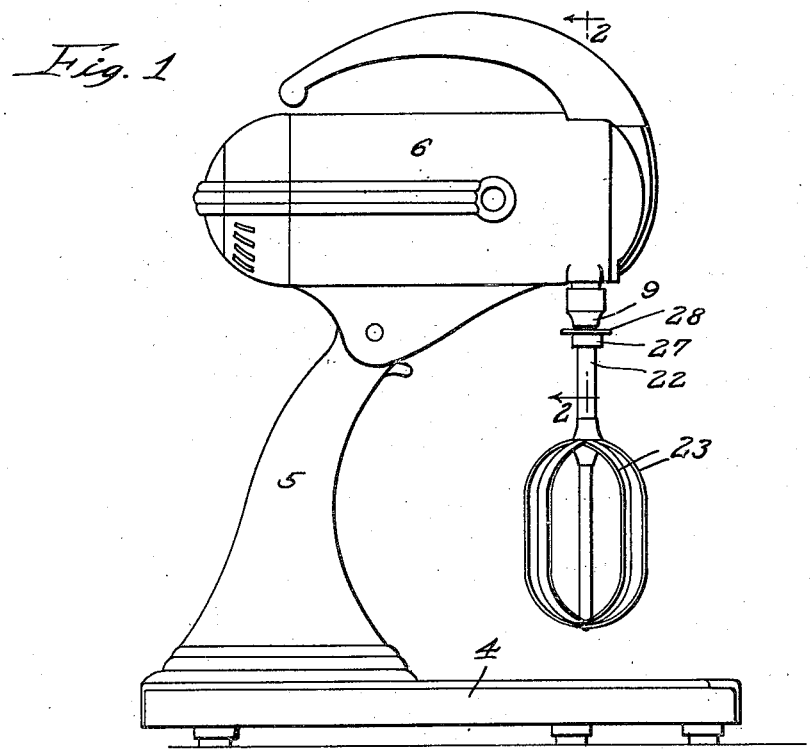
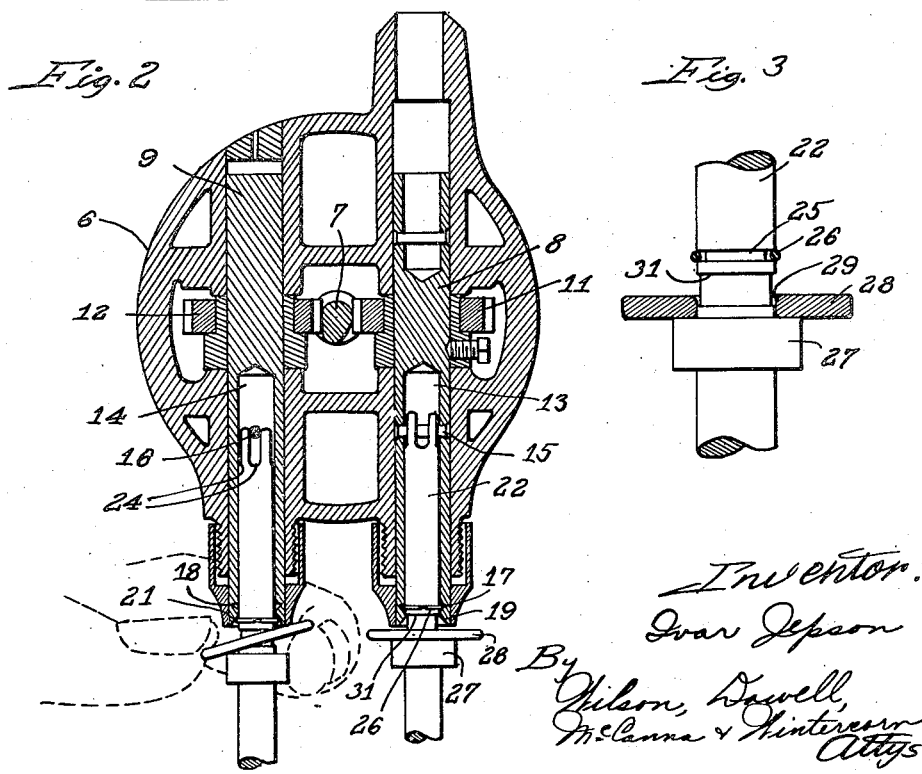
Inventor:
Ivar Jepson Patented Nov. 2, 1937

2,098,098

UNITED STATES PATENT OFFICE 2,098,098

FOOD MIXER

Ivar Jepson, Chicago, Ill., assignor to Chicago Flexible Shaft Company, Chicago, Ill., a corporation of Illinois Application September 14, 1936, Serial No. 100,649

7 Claims. (Cl. 259—1)

This invention relates to food mixers and has special reference to the combination therein of means for ejecting the beaters.

Food mixers of the household type are frequently provided with beaters which are supported therein through spring or similar retaining means, the beaters being removed from the drive assembly through longitudinal movement. During the initial part of this movement the spring tension of the retaining means must be overcome so that during this initial movement considerable force is required, whereas, during the remainder of the movement the shafts will slide freely or fall under the force of gravity. Therefore, in accomplishing this operation the users of the device have heretofore frequently found it necessary to grasp the soiled beater blades in order to exert sufficient force on the beaters to overcome this initial resistance so that the hands of the operator become soiled in the operation.

An object of the present invention is the provision of improved means for ejecting the beaters characterized by the fact that the beaters may be selectively removed by the use of one hand and in a single operation, the ejecting means is cheaper to manufacture, safe in operation, unobtrusive, occupies small space, and is free from the possibility of being accidentally actuated to eject the beaters while the mixer is in operation.

Other objects of the invention will be apparent from the following description and the accompanying drawing, in which Figure 1 is a side elevation of a household food mixer embodying my invention;

Fig. 2 is a fragmentary section on the line 2—2 of Figure 1, and

Fig. 3 is an enlarged view of the beater shaft and parts carried thereon operative in ejecting the beater.

While the invention is not limited to any particular form of food mixer I have herein shown it as embodied in a mixer having a base 4 upon which is positioned a pedestal 5 supporting a casing 6 within which is housed a motor, not shown, and a drive assembly as shown in Fig. 2 driven from the motor by means of a worm 7 on the motor shaft. The transverse spindles 8 and 9 are journaled in the casing 6 and are rotated through worm gears 11 and 12 carried thereon and meshing with the worm 7. In this instance, the spindles have longitudinal bores 13 and 14 within which are positioned transverse pins 15 and 16. The bores also have annular grooves or recesses 17 and 18 and are flared outwardly at their lower ends, as shown at 19 and 21.

Beaters are received in the bores 13 and 14 in the manner shown in Fig. 2. These beaters are identical in construction and each comprises a shaft 22 in this instance having a pair of blades 23 adjacent the lower end thereof. The upper end of the shaft is slotted, as shown at 24, for the reception of the pins 15 and 16 as the shaft is moved into the driving position with respect to the pin and the bore, as shown in the right hand portion of Fig. 2 facing the figure. The shaft has an annular recess, as shown at 25 (Fig. 3) within which is received a spring ring 26 so shaped and stressed that under compression it will rest wholly within the recess 25 and when the pressure is released will expand outwardly so as to be received in one of the annular recesses 17 and 18 in the spindle bores so as to retain the beater in its driving position in the bore.

A collar 27 is fixed on the shaft 22 at a point such that when the shaft occupies its driving position the collar will be closely spaced from the lower end of the spindle 8 or 9, the space between the collar and the end of the spindle being such as to receive a washer or similar perforated plate 28, the plate having an opening or perforation 29 of such size as to snugly fit the shaft 22 at its point of greatest diameter but to be freely movable thereon in the usual manner of a washer. The shaft 22 has a second recess 31, the lower edge of which is spaced slightly above the upper edge of the collar 27, as best shown in Fig. 3, this spacing being less than the full thickness of the plate 28 so that the full diameter of the shaft 22 serves to center the plate or washer 28 when the shaft is in its driving position, as shown on the right facing Fig. 2, but to permit the washer to be tilted in the manner shown on the left, facing Fig. 2. This tilting action causes one side of the plate to contact the lower end of the spindle and the opposed side of the plate to contact the collar 27 whereupon continued tilting of the plate causes the shaft to move longitudinally in a direction to force the spring ring 26 out of the annular groove 17 or 18 to the position shown on the left, facing Fig. 2. At this point, the latching or retaining force of the spring ring 26 has been released and the beater will slide freely out of the bore from this point. After the beaters have been removed from the spindles the disk or washer is retained thereon through the action of the collar 27 which limits its movement on the shaft in one direction and the spring ring 26 which limits movement of the washer in the opposite direction. However, in assembling the beaters the washer may be passed into position merely by forcing the same down over the spring ring 26, causing the spring to be compressed as heretofore explained. The washer may, of course be removed in the same manner but will normally be retained in place unless intentionally removed.

Attention is first directed to the simplicity of the construction, involving as it does only the provision of the collar 27, the plate or washer 28 and the annular recess 31, all of which are produced by high speed and cheap machine operations. It should also be observed that through this construction the beaters may be selectively removed from the spindle and likewise may be removed by a single operation employing but one hand, the plate being tilted, as shown in Fig. 2, and without releasing the grip the beater being completely withdrawn from the spindle. Attention is further directed to the unobtrusive nature of the device and to its small size, whereby the device would hardly be noticeable by the average individual were it not called to his attention. Furthermore, the device is such as to fit into the general symmetry of the beater and drive mechanism. Another advantage of the construction lies in the fact that it is almost entirely free of the danger of the beaters being accidentally released while the mixer is in operation, as is the case where levers or beater releasing mechanism is employed where the actuating means is located at some distance from the beaters themselves and involves the use of handles or the like which may be accidentally depressed or otherwise actuated while the mixer is in operation. Furthermore, with the particular embodiment herein shown there is no danger of being accidentally injured by the plate or washer 28 because of its being carried on the beater shaft since these washers are free to move with respect to the shaft and if desired may be grasped by the operator when the mixer is in full operation without danger of injury.

While I have thus described and illustrated a specific embodiment of the invention, I am aware that numerous alterations and changes may be made therein without departing from the spirit of the invention or the scope of the appended claims, in which—

I claim:

1. The combination in a household mixer, of a casing, a driven spindle carried on the casing, a beater having a shaft receivable in said spindle, spring means acting between the spindle and the shaft to hold the shaft in an operative driving position, a lever loosely carried on the shaft and wholly supported thereon arranged for manual tilting on the shaft to engage the shaft and another part of the mixer and thereby move the shaft longitudinally to release the beater from the spindle.

2. The combination in a mixer, of a driven spindle, a beater shaft secured thereto by spring latch means releasable upon initial longitudinal movement of the beater shaft, an abutment on said beater shaft, a second abutment fixed against longitudinal movement in closely spaced relation to said first mentioned abutment, and a member carried wholly on said beater shaft between said abutments for tilting movement thereon to impart said initial movement to said shaft by contact against said abutments.

3. The combination in a mixer, of a hollow driven spindle, a beater shaft received in said spindle, spring latch means for retaining the shaft in driving relation with the spindle, an abutment on said shaft spaced from the end of the spindle, the shaft being recessed in the area between the abutment and the end of the spindle, and a washer carried on the shaft adjacent said shoulder adapted to be manually tilted into the recess to exert longitudinal force on said shaft through contact with said shoulder and the end of said spindle.

4. The combination in a mixer, of a driven spindle having a longitudinal bore, a beater shaft received in said bore, spring latch means on said beater shaft within said bore and operative against the wall thereof, an abutment on said beater shaft spaced from the end of said spindle, and a washer on said shaft between the abutment and the end of said spindle adapted to be manually tilted to move said shaft longitudinally and thereby release said latch, the opening in said washer being of such size that said abutment and said latch means normally prevent the washer from sliding off the shaft when the beater shaft is removed from the spindle.

5. The combination in a mixer, of a driven spindle, having a longitudinal bore and an annular recess therein, a beater shaft received in said bore and having an annular recess, a spring ring in the last mentioned recess adapted to snap into the recess of said bore to retain the shaft in a driving position, a collar on said shaft in closely spaced relationship to the end of said spindle, a washer carried on said shaft intermediate the collar and the end of the spindle, said shaft having an annular recess permitting manual tilting of said washer to move said shaft longitudinally and thereby release said spring ring for the removal of the shaft from the spindle, the spring ring retaining the washer on the shaft when the shaft is out of the spindle.

6. In a mixer, a beater comprising a shaft having an annular recess, a spring latch member on said shaft at one side of said recess, an annular collar on said shaft at the opposite side of said recess, and a washer carried on the shaft between the latch member and the collar adapted to be tilted into the clearance provided by the recess to remove the beater from the mixer.

7. In a mixer, a beater comprising a shaft, a spring latch member on said shaft adapted for reception in the mixer to support the beater thereon, an annular collar on said shaft spaced from said latch member, and a washer loosely carried on the shaft between the latch member and the collar adapted to be tilted to contact the mixer and the collar to remove the beater from the mixer.

IVAR JEPSON.